No. 854,762. PATENTED MAY 28, 1907.
E. SCHAEFFER.
MEASURING INSTRUMENT.
APPLICATION FILED SEPT. 20, 1905.
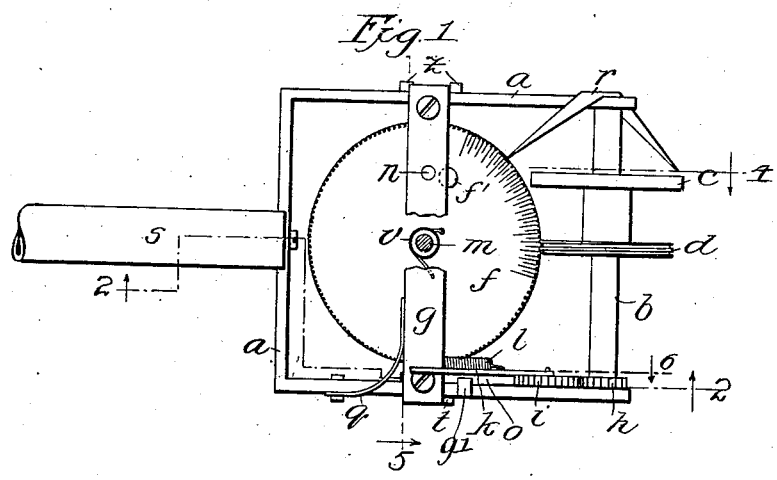
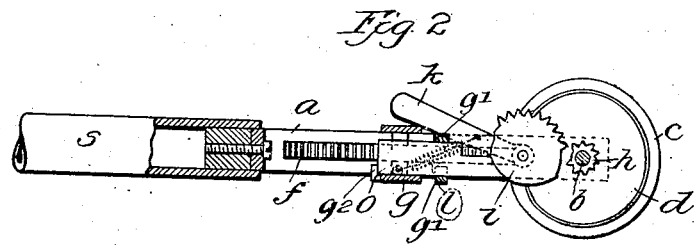
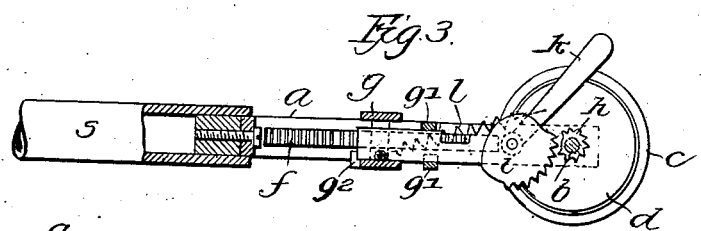
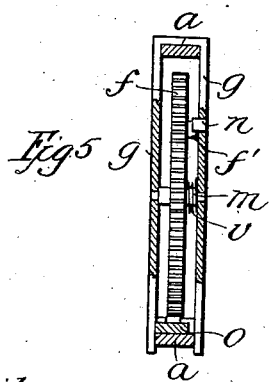
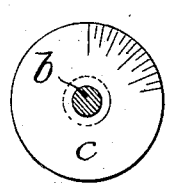
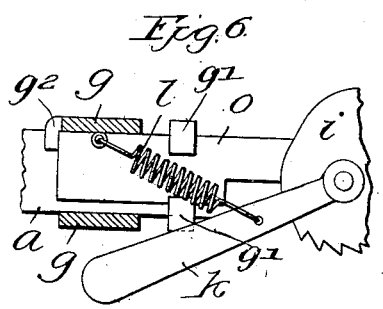
Witnesses:
Inventor:
Ernst Schaeffer,
By B. Singer
Atty.

UNITED STATES PATENT OFFICE.

ERNST SCHAEFFER, OF RIXDORF, NEAR BERLIN, GERMANY, ASSIGNOR TO HERMANN GRATTA, OF BERLIN, GERMANY.

MEASURING INSTRUMENT.

No. 854,762.　　　Specification of Letters Patent.　　　Patented May 28, 1907.

Application filed September 20, 1905. Serial No. 279,284.

*To all whom it may concern:*

Be it known that I, ERNST SCHAEFFER, a subject of the Emperor of Germany, residing at Rixdorf, near Berlin, Germany, Münchenerstr 22, have invented a new and useful Measuring Instrument, of which the following is a specification.

This invention relates to measuring instruments provided with movable surface engaging parts adapted to be applied to straight or curved surfaces to indicate the length thereof.

The invention will be more particularly described in connection with the accompanying drawings and will be more fully pointed out and ascertained in and by the appended claims.

In the drawings: Figure 1 is a plan view of a measuring instrument embodying the main features of my invention. Fig. 2 is a side elevation with parts shown in section on line 2—2 of Fig. 1. Fig. 3 is a similar view showing the parts in a different position. Fig. 4 is a face view of the surface wheel showing graduations on the same. Fig. 5 is a section on line 5 of Fig. 1. Fig. 6 is a section on line 6 of Fig. 1.

Like characters of reference designate similar parts throughout the different figures of the drawing.

The invention consists generally in the provision of a frame to which is rotatively mounted a suitable wheel or disk adapted to be applied to the surface to be measured and which will hereinafter be termed a surface wheel. Said wheel is operatively related with an indicating wheel which is preferably graduated and is adapted to indicate the measurement taken by means of the surface wheel, suitable means being provided for throwing said wheels out of operative relation and returning the same to starting or zero positions, the said means consisting of a single device preferably acting positively upon the surface wheel and indirectly upon the indicating wheel.

Referring more specifically to the drawings there is shown a yoke or frame $a$ provided at its base with a suitable handle S and carrying on its outer ends a rotatively mounted shaft $b$. A surface wheel $c$ and a worm wheel $d$ are non-rotatively mounted on said shaft, the said parts, as shown, being formed integral with a central hub. The wheel $d$ is of reduced diameter with respect to the wheel $c$ so as to avoid contact with the surface measured. On one end of the shaft $b$ there is rigidly mounted a mutilated ratchet wheel $h$.

The indicating wheel $f$ is provided on its periphery with teeth and is held in mesh with the worm wheel $d$ so that as the wheel $c$ operates upon the surface to be measured, prescribed rotative movement of the wheel $f$ is effected. The wheels $f$ and $c$ are graduated so that the measurement may be indicated by examining either of the same, there being provided for this purpose a double index finger $r$ mounted upon the frame and extending in opposite directions to points adjacent the graduated portions of each wheel. Said wheel $f$ is mounted in such a manner that it may be thrown into and out of mesh with the worm wheel $d$, the preferred construction comprising a movably mounted U-shaped frame $g$ adapted to straddle the frame $a$. The frame $a$ is provided with lugs $z$ at one side and on the other side with a single lug $t$ as clearly shown in Fig. 1. The upper end of the frame $g$ is seated loosely between the lugs $z$ and is adapted to be forced in a forward direction against said lug $t$ by a leaf spring $q$ secured at one end to the frame $a$ and engaging at its free end the rear edge of the frame $g$. The lugs $z$ $z$ and $t$ are so disposed with relation to the shaft $b$ that the wheel $f$ is normally held in mesh engagement with the worm wheel $d$ by the spring $g$. The wheel $f$ is provided with a shaft $m$, the outer ends of which are rotatively mounted in frame $g$. Said wheel $f$ is in the present construction limited to a single revolution in indicating the measurement taken, means being provided to positively arrest rotation of said wheel upon complete rotation of the same and to restore said wheel to a starting or zero position after the measurement has been indicated. To this end the wheel $f$ is provided with a projection or lug $f'$ adapted for engagement with a lug $n$ projecting inwardly from the frame $g$, said wheel in Fig. 1 being shown at a starting or zero position. As the wheel $c$ is applied to the surface to be measured and the instrument is advanced, the wheel $f$ may be rotated until it has made substantially a complete revolution whereupon the lug $f'$ will engage the lug $n$ upon the side opposite to that shown in Fig. 1. In order to restore the wheel $f$ to a starting or zero position, I desirably provide a spring $v$ which as shown is wound about the shaft $m$ on one side of the wheel $f$ and connected at its opposite ends to the frame $g$ and wheel $f$ respectively.

I will next describe the means whereby the wheel $f$ is thrown out of mesh with the worm wheel $d$, and with the wheel $c$, is returned to a starting or zero position.

There is provided a cam wheel $i$ having formed on a concentric portion of its periphery a plurality of ratchet teeth adapted to mesh with the mutilated wheel $h$. The oppositely facing portion of the periphery of said wheel $i$ is eccentric to its center and forms a cam surface the purpose of which will next be described. A reciprocating, cam bar $o$ is interposed between the frame $g$ and the cam wheel $i$, one end of the bar being provided with a cam surface adapted to be engaged by said wheel. Said cam bar is held in place and in alinement with the cam wheel $i$ by lugs $g'$ $g'$ and is engaged at its outer end by a lug $g^2$ formed on the frame $g$. Said cam wheel $i$ is provided with a lever $k$ whereby it may be thrown in opposite directions. A spiral spring $l$ is shown, the ends thereof being secured to the frame $g$ and lever $k$ respectively, said spring normally holding the wheel $i$ in the position shown in Figs. 1 and 2, and also serving by its connection with the frame $g$ through lug $g^2$ to hold the bar $o$ in engagement with its operating cam.

The operation is as follows: Assuming that the wheels $c$ and $f$ occupy zero or starting positions and that a measurement is about to be taken the operator will apply the wheel $c$ to the surface to be measured and advance the instrument thereover, rotative movement of the wheel $c$ being imparted as hereinbefore described to the wheel $f$. After the measurement has been taken and the operator desires to return the wheel to the zero or starting position, the lever $k$ is rocked forwardly from the position shown in Figs. 1 and 2 to that shown in Fig. 3, the cam surface swinging the frame $g$ rearwardly through the medium of the bar $o$ and against the action of the springs $q$ and $l$, a sufficient distance to throw the wheel $f$ out of mesh with the worm wheel $d$. When the frame $g$ is in a retracted position the spring $v$ is free to act upon the wheel $f$ and return the same to a zero or starting position. Forward movement of the lever $k$ also brings the teeth of the wheel $i$ into mesh with the wheel $h$ and rotates the latter and thereby the surface wheel $c$ until the latter is returned to a zero or starting position, the parts being so disposed that such position is effected when the mutilated portion of the wheel $h$ is brought adjacent the wheel $i$ in which position no further movement of the shaft $b$ and wheel $c$ is effected. When the wheels $f$ and $c$ have been returned to a zero position the wheel $i$ is released by the operator and is returned to the position shown in Figs. 1 and 2 by the spring $l$ and the instrument is ready for taking a new measurement.

Having now described this my invention what I claim and desire to secure by United States Letters Patent is:

1. A surface measuring instrument comprising in combination, a frame, a shaft therefor, a graduated surface wheel and a worm wheel carried by said shaft, a graduated indicating wheel, a movable frame supporting said indicating wheel and yieldingly holding the same in mesh with said worm wheel, means for returning said indicating wheel to a zero position, and means serving to disengage said indicating wheel and worm wheel.

2. A surface measuring instrument comprising in combination, a surface wheel, a worm wheel, an indicating wheel yieldingly held in mesh with said worm wheel, means normally acting to return said indicating wheel to a starting or zero position, and means for releasing mesh engagement of said worm wheel and indicating wheel, said means also returning said worm wheel to a starting position.

3. A surface measuring instrument comprising in combination a surface wheel and an indicating wheel operatively related therewith, and means for throwing said surface wheel out of operative relation with said indicating wheel and effecting return of said surface wheel to a starting position.

4. A surface measuring instrument comprising in combination a frame, a graduated surface wheel, a worm wheel and a mutilated ratchet wheel, a shaft mounted in said frame for carrying said wheels, a graduated indicating wheel, a movable frame supporting said indicating wheel, a spring engaging said frame to hold the indicating wheel and worm wheel in mesh, a cam actuated bar for retracting said movable frame, a cam wheel provided with a cam surface engaging said bar, and teeth engaging said mutilated wheel to bring the mutilated portion thereof adjacent the cam pinion, and a spring connecting said cam pinion and said movable frame.

5. A surface measuring instrument comprising in combination a graduated surface wheel and a graduated indicating wheel operatively related, a double pointer or index for said wheels, and means for throwing said indicating wheel out of operative relation with said surface wheel to permit return of said indicating wheel to a starting or zero position, said means serving to positively return said surface wheel to a starting position.

6. A surface measuring instrument comprising in combination a surface wheel, an indicating wheel operatively related with said surface wheel, a swinging frame for said indicating wheel, and means engaging said frame to throw said indicating wheel out of operative relation with said surface wheel, said means also serving to simultaneously return said surface wheel to a starting position.

7. A surface measuring instrument comprising in combination a surface wheel, an indicating wheel operatively related with said surface wheel, a swinging frame for said indicating wheel, and an oscillating element having oppositely disposed operating parts serving when oscillated in one direction to swing said frame and throw said indicating wheel out of operative relation with said surface wheel and simultaneously effecting return of said surface wheel to a zero or starting position.

8. A surface measuring instrument comprising in combination a surface wheel, a mutilated ratchet wheel for said surface wheel, an indicating wheel operatively related with said surface wheel, a swinging frame for said indicating wheel, and a cam wheel provided on one side with a cam and on its opposite side with teeth adapted to mesh with said ratchet wheel, a cam bar interposed between said cam surface and said frame, said cam wheel serving when oscillated in one direction to simultaneously throw said indicating wheel out of operative relation with said surface wheel and return the latter to a starting position.

9. A surface measuring instrument comprising in combination a frame, a graduated surface wheel, a worm wheel and a mutilated ratchet wheel, a shaft mounted in said frame for carrying said wheels, a graduated indicating wheel, a movable frame supporting said indicating wheel, a spring engaging said frame to hold the indicating wheel and worm wheel in mesh, a cam actuated bar for retracting said movable frame, a cam wheel provided with a cam surface engaging said bar, and teeth engaging said ratchet wheel to bring the mutilated portion thereof adjacent the cam wheel, a spring connecting said cam wheel and said movable frame, and a double pointer or index for said surface and indicating wheels.

10. A surface measuring instrument comprising in combination a graduated surface wheel and a graduated indicating wheel operatively related, a spring for returning said indicating wheel to a zero position, a double pointer or index for said wheels, and means for throwing said indicating wheel out of operative relation with said surface wheel to permit return of said indicating wheel to a starting or zero position, said means serving to positively return said surface wheel to a starting position.

11. A surface measuring instrument comprising in combination a graduated surface wheel and a graduated indicating wheel operatively related, a spring for returning said indicating wheel to a zero position, stops arresting said indicating wheel at a zero position, a double pointer or index for said wheels, and means for throwing said indicating wheel out of operative relation with said surface wheel to permit return of said indicating wheel to a starting or zero position, said means serving to positively return said surface wheel to a starting position.

12. A surface measuring instrument comprising in combination a surface wheel, an indicating wheel operatively related with said surface wheel, a spring for returning said indicating wheel to a zero position, stops arresting said wheel at a zero position, a swinging frame for said indicating wheel, and means engaging said frame to throw said indicating wheel out of operative relation with said surface wheel, said means also serving to simultaneously return said surface wheel to a starting position.

13. A surface measuring instrument comprising in combination a surface wheel, an indicating wheel operatively related with said surface wheel, a spring for returning said indicating wheel to a zero position, stops arresting said wheel at a zero position, a swinging frame for said indicating wheel, and an oscillating element having positively disposed operating parts serving when oscillated in one direction to swing said frame and throw said indicating wheel out of operative relation with said surface wheel and simultaneously effecting return of said wheel to a zero or starting position.

14. A surface measuring instrument comprising in combination a surface wheel, a mutilated ratchet wheel for said surface wheel, an indicating wheel operatively related with said surface wheel, a spring for returning said indicating wheel to a zero position, stops arresting said wheel at a zero position, a swinging frame for said indicating wheel, and an oscillating member provided on one side with a cam and on its opposite side with teeth, a cam bar interposed between said cam surface and said frame, said member serving when oscillated in one direction to simultaneously throw said indicating wheel out of operative relation with said surface wheel and return the latter to a starting position.

15. A surface measuring instrument comprising in combination a frame, a graduated surface wheel, a worm wheel and a mutilated ratchet wheel, a shaft mounted in said frame for carrying said wheels, a graduated indicating wheel, a movable frame supporting said indicating wheel, a spring for returning said indicating wheel to a zero position, stops arresting said wheel at a zero position, a spring engaging said frame to hold the indicating wheel and worm wheel in mesh, a cam wheel provided with a cam surface, a cam bar engaged thereby, and teeth engaging said mutilated wheel to bring the mutilated portion thereof adjacent the cam wheel, a spring connecting said cam wheel and said movable frame, and a double pointer or index for said surface and indicating wheels.

In testimony whereof I have affixed my signature in presence of two witnesses.

ERNST SCHAEFFER.

Witnesses:
   WOLDEMAR HAUPT,
   HENRY HASPER.